Figure 1:
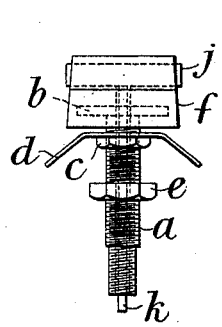

No. 617,337. Patented Jan. 10, 1899.
J. HARRISON.
BICYCLE VALVE.
(Application filed Mar. 14, 1898.)

(No Model.)

Witnesses
A. J. Hood
Sidney P. Hollingsworth

John Harrison, Inventor.
By John J. Halsted & Son,
his Attorneys.

THE NORRIS PETERS CO., PHOTO-LITHO., WASHINGTON, D. C.

UNITED STATES PATENT OFFICE.

JOHN HARRISON, OF PETERBOROUGH, ENGLAND, ASSIGNOR TO THE ELLIPTIC CYCLE COMPANY, LIMITED, OF SAME PLACE.

BICYCLE-VALVE.

SPECIFICATION forming part of Letters Patent No. 617,337, dated January 10, 1899.

Application filed March 14, 1898. Serial No. 673,759. (No model.)

*To all whom it may concern:*

Be it known that I, JOHN HARRISON, a subject of the Queen of Great Britain, residing at Peterborough, England, have invented new and useful Improvements in Valves for Pneumatic Tires, (for which I have applied for a patent in Great Britain, No. 27,410, dated November 22, 1897,) of which the following is a specification.

My invention relates to valves for pneumatic tires, and has for its object to simplify the construction and increase the efficiency of the same.

A valve constructed according to my invention comprises a tubular T-piece the stem of which is externally screw-threaded and designed to be fixed to the air-bag and rim in any desirable manner, while the cross-head of the said T-piece has fixed to it a block or piece of india-rubber or the like, which forms the valve proper, and is hereinafter referred to as such, the said valve proper having a hole extending longitudinally through it and a transverse hole between the longitudinal hole and the passage through the stem of the T-piece. Through the longitudinal hole in the valve proper is a bar, which has attached to it a rod or shank, which extends through the stem and projects slightly beyond the end of the same, so as to permit of moving the said bar to open the valve to allow the escape of air.

To enable my invention to be fully understood, I will describe the same by reference to the accompanying drawings, in which—

Figure 2:
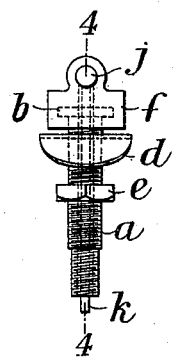
Figure 4:
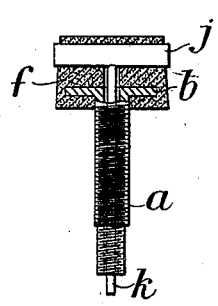
Figure 3:
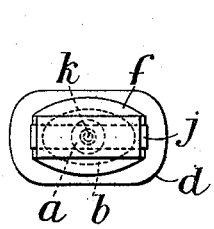
Figure 6:
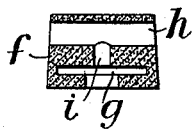
Figure 5:
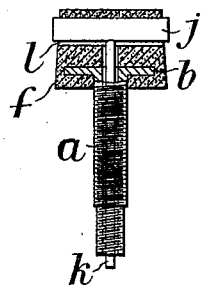

Figure 1 is a side elevation of my improved valve. Fig. 2 is an end elevation, and Fig. 3 is a plan. Fig. 4 is a section on the line 4 4, Fig. 2; and Fig. 5 is a view similar to Fig. 4, but showing the parts in a different position. Fig. 6 is a view of the valve proper detached.

$a$ is the tubular stem of the T-piece, and $b$ is a plate or flange formed upon or fixed to the said stem and constituting the cross-head of the said T-piece. The said stem is externally screw-threaded, the thread on one part being designed to receive the nut $c$ for clamping the air-bag against the usual spring-plate $d$ and the nut $e$ for securing the valve upon the rim, while the thread on the outer end of the stem is designed for the attachment of the pump in the usual manner.

$f$ is the valve proper, which, as shown detached in Fig. 6, is formed with the recess $g$ for receiving the plate $b$, and with the longitudinal hole $h$ and the transverse hole $i$.

$j$ is the bar, which is introduced into the hole $h$ and fits therein in such a manner that under the pressure of the air-pump the air will pass between the said bar $j$ and the valve proper, but that the pressure upon the exterior of the said valve proper will force the same into tight contact with the said bar and so prevent the passage of air in a backward direction.

$k$ is the shank, which is passed through the stem $a$ and the hole $i$ of the valve proper and connected to the bar $j$ in such a manner that when the said shank $k$ is pressed the bar $j$ will be caused to stretch the valve proper and form a passage, as indicated at $l$, Fig. 5, through which the air can escape for deflating the tire.

It will be understood that when my improved valve is fixed in position the valve proper is entirely within the air-bag.

I do not limit myself to the method of connecting the valve proper to the stem shown in the drawings, as it may be held in other manners. For instance, the valve proper may be in the form of a piece of india-rubber tubing held in a clip formed upon the end of the stem.

Having now particularly described and ascertained the nature of my said invention and in what manner the same is to be performed, I declare that what I claim is—

1. In a valve for pneumatic tires, the combination of a tubular stem, an india-rubber valve proper secured on or fixed to one end of the said stem and having a longitudinal hole extending through it, a bar fitted into the said hole and a shank passing through the stem into contact with the bar, all substantially as, and for the purpose, described.

2. In a valve for pneumatic tires, the combination of a valve-stem, a plate formed upon one end of the said valve-stem, a valve proper provided with a recess to fit over the said plate and with a longitudinal aperture through it and a transverse aperture between the said longitudinal aperture and the passage through the stem, a bar fitted into the said longitudinal passage and a rod or shank extending through the tubular stem and the transverse aperture into contact with the bar, substantially as described.

JOHN HARRISON.

Witnesses:
W. STUART THOMPSON,
J. HOBKIRK.